United States Patent
Cui et al.

(10) Patent No.: US 10,638,498 B2
(45) Date of Patent: Apr. 28, 2020

(54) FREQUENCY SELECTIVE ALMOST BLANK SUBFRAMES

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 578 days.

(21) Appl. No.: 14/633,230

(22) Filed: Feb. 27, 2015

(65) Prior Publication Data

US 2016/0255631 A1 Sep. 1, 2016

(51) Int. Cl.
 *H04W 72/00* (2009.01)
 *H04W 72/12* (2009.01)
 *H04W 84/04* (2009.01)

(52) U.S. Cl.
 CPC .... *H04W 72/1242* (2013.01); *H04W 72/1289* (2013.01); *H04W 84/045* (2013.01)

(58) Field of Classification Search
 None
 See application file for complete search history.

(56) References Cited

U.S. PATENT DOCUMENTS

| 8,611,295 | B2 | 12/2013 | Song et al. |
| 8,755,791 | B2 | 6/2014 | Bontu et al. |
| 8,837,301 | B2 | 9/2014 | Krishnamurthy |
| 8,838,125 | B2 | 9/2014 | Dalsgaard et al. |
| 8,843,139 | B2 | 9/2014 | Yu et al. |
| 9,642,029 | B2 * | 5/2017 | Weber ............... H04W 36/0088 |
| 2011/0249642 | A1 | 10/2011 | Song et al. |
| 2012/0113812 | A1 * | 5/2012 | Ji ...................... H04W 72/1263 370/241 |

(Continued)

FOREIGN PATENT DOCUMENTS

| JP | 2012090356 A | 5/2012 |
| WO | 2011159988 A1 | 12/2011 |

(Continued)

OTHER PUBLICATIONS

Bharucha, Zubin, et al. "Small Cell Deployments: Recent Advances and Research Challenges," arXiv preprint arXiv:1211.0575, 2012, pp. 1-19.

(Continued)

*Primary Examiner* — Christopher T Wyllie
(74) *Attorney, Agent, or Firm* — Zagorin Cave LLP (57) ABSTRACT

Frequency selective almost blank subframes (ABS) are scheduled in a heterogeneous network in which a protected portion of an available frequency band is allocated to protected subframes transmitted in by a small cell during a first time period and an unprotected portion of the frequency band is allocated to non-protected subframes transmitted during the first time period by the macro cell. The macro cell in the heterogeneous network utilizes the unprotected portion of the frequency band to transmit data to served user equipment (UEs) during ABS while the small cell uses the protected portion of the frequency band to transmit data to served UEs during ABS. That can improve service to low latency applications both for UEs served by the macro cell and for UEs being served by the small cell(s).

20 Claims, 5 Drawing Sheets

(56) References Cited

U.S. PATENT DOCUMENTS

| | | | |
|---|---|---|---|
| 2012/0113843 A1* | 5/2012 | Watfa | H04W 72/1289 370/252 |
| 2012/0113844 A1* | 5/2012 | Krishnamurthy | H04L 1/0026 370/252 |
| 2012/0115469 A1 | 5/2012 | Chen et al. | |
| 2012/0122472 A1 | 5/2012 | Krishnamurthy et al. | |
| 2013/0045740 A1 | 2/2013 | Gayde et al. | |
| 2013/0121191 A1 | 5/2013 | Song et al. | |
| 2013/0136027 A1* | 5/2013 | Matsuo | H04W 24/10 370/252 |
| 2013/0176887 A1 | 7/2013 | Seo et al. | |
| 2013/0194950 A1 | 8/2013 | Haghighat et al. | |
| 2013/0272274 A1* | 10/2013 | Ishida | H04W 72/082 370/336 |
| 2013/0286849 A1* | 10/2013 | Park | H04B 7/024 370/241 |
| 2013/0286952 A1 | 10/2013 | Ghosh et al. | |
| 2013/0288696 A1* | 10/2013 | Nanri | H04W 72/082 455/452.1 |
| 2013/0322235 A1 | 12/2013 | Khoryaev et al. | |
| 2014/0050128 A1* | 2/2014 | Campoy Cervera | H04W 72/0426 370/280 |
| 2014/0050177 A1* | 2/2014 | Takano | H04W 72/082 370/329 |
| 2014/0098754 A1* | 4/2014 | Luo | H04L 5/0053 370/329 |
| 2014/0112254 A1* | 4/2014 | Lindoff | H04W 74/002 370/328 |
| 2014/0119332 A1* | 5/2014 | Kim | H04W 52/243 370/330 |
| 2014/0119334 A1 | 5/2014 | Kazmi et al. | |
| 2014/0135028 A1 | 5/2014 | Wang et al. | |
| 2014/0170985 A1 | 6/2014 | Raghavan et al. | |
| 2014/0171091 A1 | 6/2014 | Cai et al. | |
| 2014/0192734 A1 | 7/2014 | Ng et al. | |
| 2014/0200001 A1 | 7/2014 | Song et al. | |
| 2014/0213274 A1 | 7/2014 | Weber et al. | |
| 2014/0233457 A1 | 8/2014 | Koutsimanis et al. | |
| 2014/0242989 A1 | 8/2014 | Cai et al. | |
| 2014/0293948 A1 | 10/2014 | Jiang | |
| 2014/0293952 A1 | 10/2014 | Maniatis et al. | |
| 2015/0071387 A1* | 3/2015 | Luo | H04L 1/0054 375/341 |
| 2015/0257164 A1* | 9/2015 | Lim | H04L 5/0073 370/252 |
| 2015/0296430 A1* | 10/2015 | Bakker | H04W 36/0094 455/444 |
| 2016/0255631 A1* | 9/2016 | Cui | H04W 72/1242 370/329 |

FOREIGN PATENT DOCUMENTS

| | | |
|---|---|---|
| WO | 2013189728 A1 | 12/2013 |
| WO | 2014012214 A1 | 1/2014 |
| WO | 2014056650 A1 | 4/2014 |
| WO | 2014068530 A1 | 5/2014 |
| WO | 2014148875 A1 | 9/2014 |

OTHER PUBLICATIONS

Ghosh, Amitabha, et al. "Heterogeneous Cellular networks: From Theory to Practice," IEEE Communications Magazine, Jun. 2012, pp. 54-64

Kamel, Mahmoud I., and Khaled, MF Elsayed. "ABSF Offsetting and Optimal Resource [artitioning for eICIC in LTE-Advanced: Proposal and Analysis Using a Nash Bargaining Approach," Communications (ICC), 2013 IEEE International Conference on. IEEE, 2013, 7 pages.

Liu, An, et al. "Hierarchical radio resource optimization for heterogeneous networks with enhanced inter-cell interference coordination (eICIC)," arXiv preprint arXiv:1305.5884, May 25, 2013, 14 pages.

Tran, Thien-Toan, et al., Overview of enabling technologies for 3GPP LTE-advanced, EURASIP Journal on Wireless Communications and Networking, Springer 2012, 19 pages.

Wang Hua, et al. "Analysis of Carrier Deployment Strategies for LTE-A HetNets with Multicell Cooperation," Vehicular Technology Conference (VTC Fall), 2014 IEEE 80th. IEEE, 2014. 5 pages.

Technical Specification, "LTE; Evolved Universal Terrestrial Radio Access Network (E-UTRAN); X2 Application Protocol (X2AP) (3GPP TS 36.423 version 11.8.0 Release 11)", Mar. 2014, 145 pages.

\* cited by examiner

FREQUENCY SELECTIVE ALMOST BLANK SUBFRAMES

BACKGROUND

Field of the Invention

This disclosure relates to wireless communications and in particular to enhancements to controlling interference using almost blank subframes (ABS).

Description of the Related Art

Mobile traffic has grown at a very fast pace and the trend is continuing. To meet the mobile traffic growth demand and improve the end user experience, mobile service providers are actively looking for mechanisms to improve system capacity and end user experience. Deploying small cells (such as metro cells or pico cells) can help to improve coverage and capacity. Metro cells can be deployed in many different ways. Many mobile operators deploy metro cells co-channel with macro cells for use in spectrum limited situations. Such deployments result in heterogeneous networks (HetNets) that include different kind of access points serving different kinds of cells with overlapping coverage areas. For example, HetNets may include macro cells and small cells (metro cells, femtocells, and/or pico cells) with overlapping coverage areas. Communication devices within the overlapping coverage areas can suffer from significant co-channel interference.

To mitigate interference in a HetNet environment, Enhanced Inter-Cell Interference Coordination (eICIC) mechanisms can be used, in which the macro cell avoids scheduling data in "protected" sub-frames as specified by Third Generation Partnership Project (3GPP) Release 10 (Rel-10). The protected sub-frames of eICIC are known as "Almost blank subframes" (ABS) and do not transmit any traffic channels and mostly comprise low-power control channel frames. User equipment (UE) located in the pico/metro cell range expansion area is only scheduled on the protected subframes. That allows the pico/metro cell to communicate with the UE with reduced interference from the macro cell. For the inner part of the metro cell, user equipment can be scheduled on any subframe (almost blank or otherwise) as the transmit power of the metro cell is strong enough to overcome interference. For the user equipment served by the macro cell, the UE can only be scheduled during non-protected subframes.

A further enhancement, Further Enhanced Inter-cell Interference Coordination (FeICIC) was proposed in 3GPP Release 11 in which inter-cell interference can be further reduced through cancellation of interference on common control channels of ABS caused by Common Reference Signals (CRS) of high power macro cells and critical broadcast system information can be better detected in the cell range extension region around the metro cell. Also, to relieve some negative impact on macro layer capacity in eICIC/FeICIC, reduced power ABS was proposed to improve HetNet capacity (instead of zero-power ABS) by reducing capacity loss in macro cells.

However, further improvement to ABS approaches is desirable to avoid adverse impacts on macro cell capacity and improve overall throughput.

SUMMARY OF EMBODIMENTS OF THE INVENTION

Accordingly, in one embodiment a method includes scheduling a frequency selective subframe pattern in a heterogeneous network including a macro cell and at least one small cell in which a protected portion of a frequency band is allocated to protected subframes transmitted in the macro cell by a macro cell access point during a particular subframe of a radio frame and an unprotected portion of the frequency band is allocated to unprotected subframes transmitted during the particular subframe in the macro cell by the macro cell access point. The scheduling includes allocating a first plurality of resource blocks to the protected subframes, the first plurality of resource blocks being the protected portion of the frequency band. The scheduling further includes allocating a second plurality of resource blocks to the unprotected subframes, the second plurality of resource blocks being the unprotected portion of the frequency band.

Another embodiment provides an apparatus for use in a heterogeneous network having a macro cell and a small cell. The apparatus includes control logic associated with the macro cell that is configured to schedule a frequency selective subframe pattern in which protected subframes are transmitted by a macro cell access point in the macro cell during a particular subframe of a radio frame using a protected portion of a frequency band and unprotected subframes are transmitted during the particular subframe by the macro cell access point using an unprotected portion of the frequency band. At least one transmitter of the macro cell access point transmits the protected subframes and the unprotected subframes during the particular subframe. A first plurality of resource blocks are allocated to the protected subframes, the first plurality of resource blocks being the protected portion of the frequency band and a second plurality of resource blocks are allocated to the unprotected subframes, the second plurality of resource blocks being the unprotected portion of the frequency band.

In another embodiment, a heterogeneous network includes a macro cell having a first coverage area and a macro cell access point. The network further includes at least one small cell having a second coverage area that overlaps with a portion the first coverage area and has a small cell access point. Control logic associated with the macro cell is configured to schedule a frequency selective subframe pattern in which protected subframes are transmitted by the macro cell access point during a particular subframe of a radio frame using a protected portion of a frequency band and unprotected subframes are transmitted during the particular subframe by the macro cell access point using an unprotected portion of the frequency band and the control logic being further configured to cause information regarding the frequency selective subframe to be communicated to control logic associated with small cell. The macro cell access point includes at least one transmitter to transmit the protected subframes and the unprotected subframes during the particular subframe. The small cell access point includes at least one transmitter to transmit data to user equipment in a range extension area of the small cell during the particular subframe using the protected portion of the frequency band. A first plurality of resource blocks are allocated to the protected subframes, the first plurality of resource blocks being the protected portion of the frequency band. A second plurality of resource blocks are allocated to the unprotected subframes, the second plurality of resource blocks being the unprotected portion of the frequency band.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., and be applied to various networked environments or standards.

One approach to increasing macro cell capacity would be to schedule ABS relatively infrequently to avoid negative capacity impact on the macro cell. That will increase bandwidth available to the macro cell but will impact performance on the cell edge UEs of the small cells. That will be especially true for applications with stringent delay and jitter requirements seen particularly in voice, gaining, and vehicle to vehicle applications in 5G. Note that if ABS utilizes the whole frequency band, that removes the whole bandwidth (e.g. 20 Mhz for the 20 MHz band carrier) available to the macro cell when subframes are ABS subframes. That results in reduced macro cell capacity and inefficient spectrum usage. The inefficiency is more profound in the case of a smaller number of metro cells under the macro coverage, since the macro cell gives up resources unnecessarily.

Accordingly, enhancements to FeICIC (Further enhanced Inter-cell interference coordination) and eICIC (enhanced Inter-cell interference coordination) is provided by using partial carrier bandwidth allocation for ABS.

As used in this application, the terms "component," "module," "system," "access point", "control logic", "interface", "node", "platform," or the like are generally intended to refer to hardware, a computer-related entity, either hardware, a combination of hardware and software, software stored on computer readable media, or software in execution on a computer. For example, a component can be, but is not limited to being, software running on one or more processors, or one or more processors configured by software to accomplish particular tasks described herein.

Further, the various embodiments described herein can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but is not limited to magnetic storage devices, optical storage devices, and various kinds of electrically based volatile and non-volatile storage devices.

The systems and methods disclosed herein facilitate enhancing FeICIC and/or eICIC to enable a portion of the frequency band to be allocated to almost blank subframes while other portions of the frequency band are available for normal macro cell usage in which transmissions during the subframe can include data. The systems and methods described herein can improve mobility performance, spectrum efficiency, and/or overall network capability of the HetNet.

Figures 1, 2:
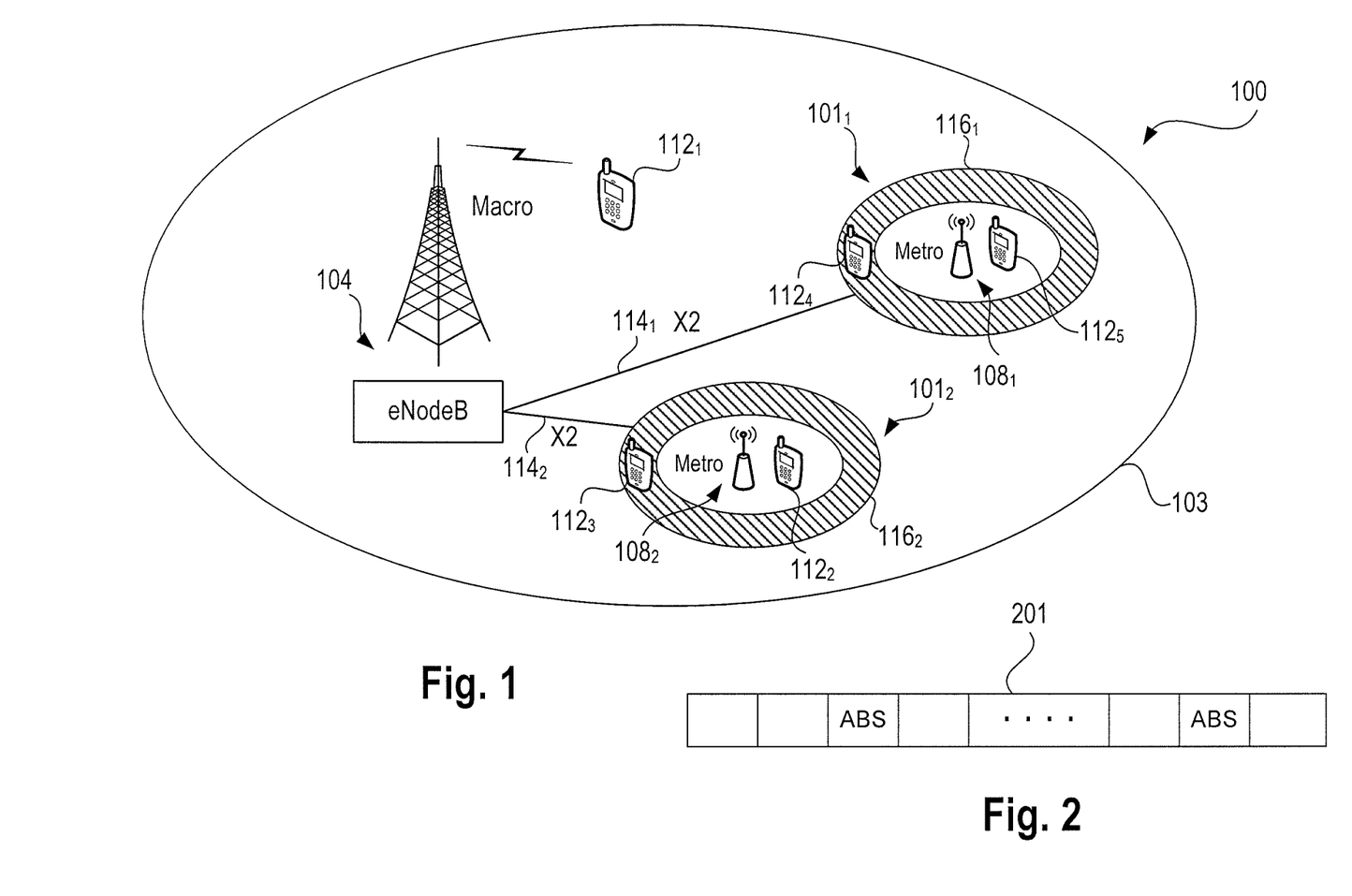
FIG. 1 illustrates an example system that improves a capacity of a heterogenous network and provides resources to metro cells.
FIG. 2 illustrates an example of a bit field communicated by the macro cell controller to one or more metro cells to indicate which subframes are almost blank subframes.

Referring to FIG. 1 system 100 is shown in Which embodiments described herein can be implemented to improve system capacity while still reducing interference experienced in one or more metro cells $101_1$ and $101_2$. System 100 depicts an exemplary heterogeneous communication network (HetNet)) that includes a macro access point 104 that serves one or more user equipment (UE) $112_1$ within macro cell 103. The access point 104 may include but is not limited to an eNodeB for Long Term Evolution (LTE) systems or more generally a base station. The illustrated system 100 includes metro access points ($108_1$, $108_2$), serving respectively, metro cells $101_1$ and $101_2$ having coverage areas that overlap with the coverage area of macro access point 104. In one aspect, the macro access point 104 and/or the one or more metro access points ($108_1$, $108_2$) can be managed by and be part of a self-optimizing network (SON). As an example, the metro access points $108_1$, $108_3$ can include, but are not limited to a pico station, a femto access point, a Home eNodeB, a relay node (RN), etc. In one aspect, system 100, using frequency selective ABS embodiments described herein increases a capacity of the macro access point 104 while reducing inter-cell interference in the system 100. Note that the macro access point 104 can be most any access point, such as, but not limited to, a macro access point, a base station, or an eNodeB (eNB).

Small cell (e.g., metro, pico, femto) access points ($108_1$, $108_2$) are wireless access points that are deployed to improve wireless coverage and capacity, and to offload traffic from the macro cell. The small cell may be interfaced with a wired broadband network and offload traffic from a mobile radio access network (RAN) operated by a wireless service provider. Improved coverage in the metro cell includes stronger signal, increased bandwidth, and improved reception (e.g., video, sound, or data), ease of session or call initiation, and session or call retention, as well. Offloading traffic from the RAN reduces operational and transport costs for the service provider since fewer end users consume radio resources.

The UEs shown in FIG. 1 include UEs $112_2$-$112_5$ being served by metro cells and the UE $112_1$ being served by the macro cell. The term "UE" is intended to include a wide variety of equipment. As an example, the UEs (e.g., $112_1$-$112_5$) can include most any electronic communication devices such as, but not limited to, consumer electronic devices, for example, a tablet computer, a digital media player, a digital photo frame, a digital camera, a cellular phone, a personal computer, a personal digital assistant (PDA), a smart phone, a laptop, a gaming system, etc. Further, the UEs can also include, LTE-based devices, such as, but not limited to, most any home or commercial appliance that includes an LTE radio. Note that the UEs may be mobile, have limited mobility or be stationary. In one example, UEs include a multi-band, multimode, and/or multi-radio device.

Metro cells can further be classified into different cell types, such as micro cells, pico cells, femto cells, home eNBs, etc. based on their different cell sizes. Such cells are also referred to herein as small cells and the term small cell is used interchangeably herein with metro cell. The cell size of a cell can be determined based on various factors such as, but not limited to, the transmission power of its access point, coverage area, antenna position, location (e.g. rural or city, indoor or outdoor). Typically, the macro access point 104 transmits long range high power signals providing hundreds or thousands of meters of coverage, while the metro access points (108$_1$, 108$_2$) transmit shorter range and lower power signals typically providing tens to hundreds of meters of coverage. To mitigate interference between the macro access point 104 and the metro access points (108$_1$, 108$_2$), an eICIC/FeICIC mechanism can be utilized as specified by 3GPP Release 10 and 11. According to eICIC, the macro access point 104 can schedule and/or configure blanking of subframes (designated as Almost Blank subframes (ABS)) in the time domain. The metro access points (108$_1$, 108$_2$) can transmit information to their UEs in the range expansion area (hatched portions 116$_1$ and 116$_2$ of the metro cells 101$_1$ and 101$_2$ during the ABS to reduce interference from the macro access point 104. The subframes are considered "Almost Blank" since user traffic is not transmitted during these subframes; however, minimal control traffic can still be transmitted from the macro access point. FIG. 2 illustrates a bit field 201 that can be communicated to the metro cells by the macro cell access point or control logic associated with the macro cell access point, over, e.g., an X2 interface 114$_1$ and 114$_2$, that indicates which of the subframes are to be ABS. The ABS pattern 201 (which subframes are scheduled for ABS) may be exchanged over X2 via a Load Information message. Note that the X2 interfaces 114$_1$ and 114$_2$ can be a logical interface between access points and is not limited to a dedicated physical connection between access points. The X2 interface can couple access points via an existing IP transport network.

Although interference may be reduced through the use of ABS and eICIC/FeICIC, the macro cell capacity is significantly reduced since all the bandwidth in almost blank subframes is allocated for metro cell utilization whether or not the bandwidth can be exploited by the metro cell. The use of ABS and eICIC/FeICIC also limits macro transmission for delay sensitive applications to macro cell UEs. In order to reduce the capacity/latency impact on the macro cell, and improve latency performance for both macro cell UEs and for small cell edge UEs, rather than allocate the bandwidth to ABS subframes, during ABS subframes only a variable portion of the bandwidth is allocated based on performance/loading of the metro cells and the macro cell.

Figure 3:
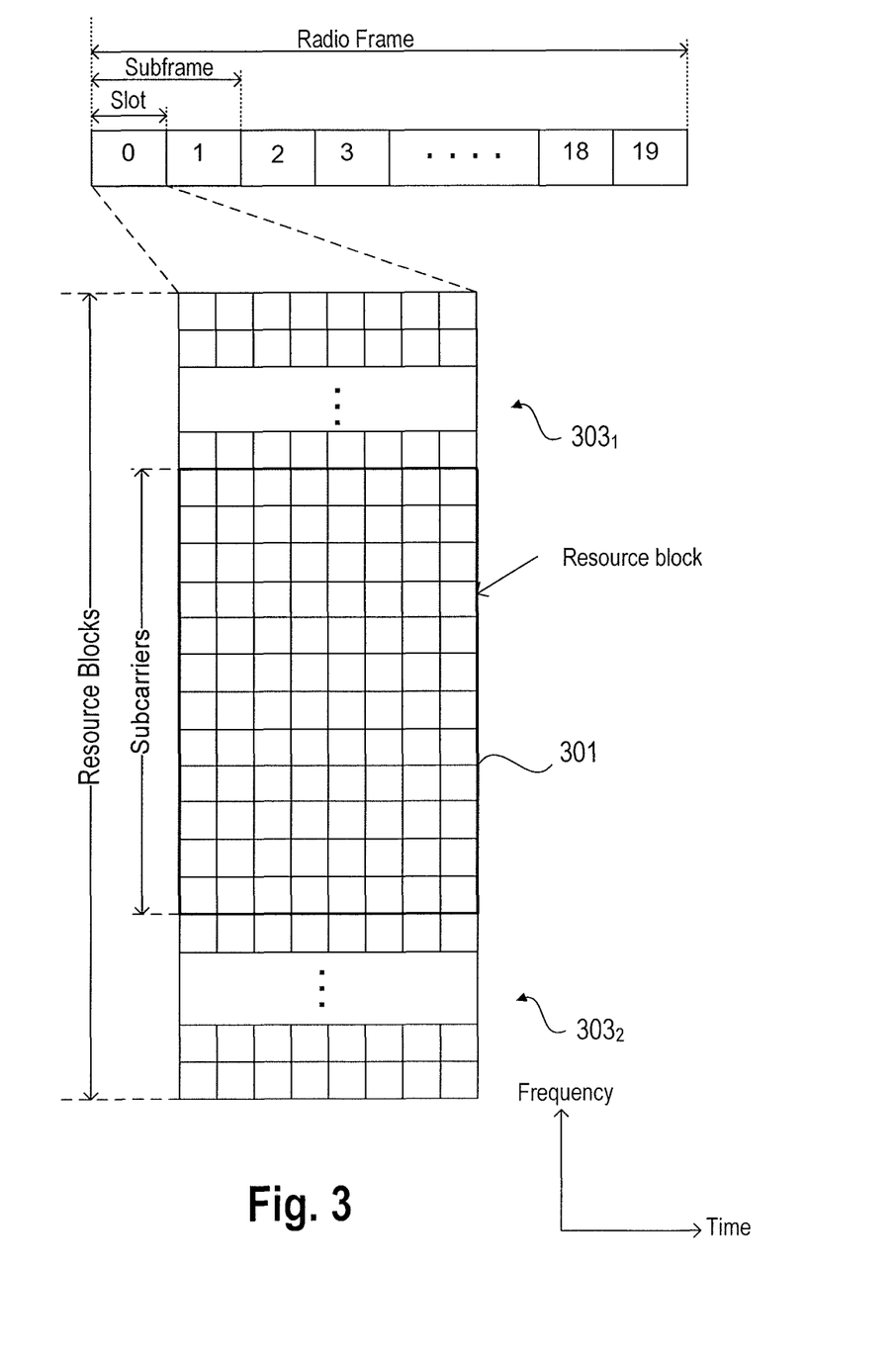
FIG. 3 illustrates frequency resource blocks that may be allocated during designated ABS subframes to ABS or to normal macro cell transmissions.

FIG. 3 illustrates an example of frequency bandwidth in the downlink in current LTE systems. FIG. 3 shows a resource block 301 (outlined in bold) that includes a number of subcarriers. The resource block illustrated is transmitted over one slot of a subframe consisting of two slots. The entire radio frame may include 20 subframes in one embodiment. There are a number of other resource blocks in the frequency band allocated to the downlink including the illustrated portions 303$_1$ and 303$_2$. The number of resource blocks available depends on such factors as transmission bandwidth, subcarrier spacing, and cyclic prefix configuration. There may be, e.g., 50 resource blocks available for the downlink with a 10 MHz transmission bandwidth.

Rather than allocate all 50 resource blocks to ABS, according to an embodiment, a first protected portion of the bandwidth (resource blocks) is allocated to ABS and a second unprotected portion of the resource blocks is utilized by macro access point 104 for data transmission rather than being reserved for ABS. Note that the portions of the frequency band scheduled for ABS or non-ABS during ABS designated subframes may be contiguous or non-contiguous.

Figure 4:
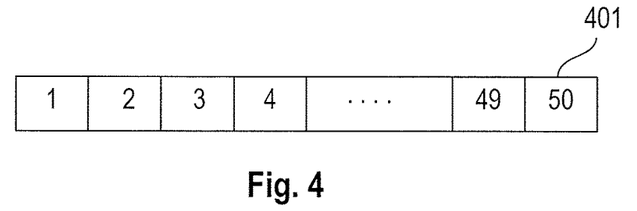
FIG. 4 illustrates an example bit field sent by the macro cell controller to one or more metro cells to indicate which portion of the bandwidth is allocated to almost blank subframes.

Referring to FIG. 4, the configuration of the resource blocks as ABS or non-ABS resource blocks for the almost blank subframes can be communicated by the macro cell controller to the one or more metro cells in the coverage area of the macro cell using the bitmap 401. Thus, e.g., a bit may be provided for each of 50 resource blocks with a first value, e.g., a "1" indicating an ABS resource block and a second value, a "0" indicating a non-ABS resource block. The bitmap 401 may be provided to the metro access points (108$_1$, 108$_2$), for example, via, e.g., an X2-interface.

Figure 5:
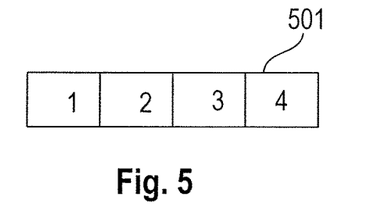
FIG. 5 illustrates an example profile field sent by the macro cell controller to one or more metro cells to indicate which profile is to be used to allocate bandwidth to almost blank subframes.

Referring to FIG. 5, in another embodiment, rather than having to communicate a large number of bits commensurate with the number of resource blocks, one of a plurality of profiles is provided using a small field. In the example of FIG. 5, a four bit field 501 is provided that allows up to 16 different profiles to be sent. Each different profile has a different number of resource blocks (or a different region of the bandwidth) allocated to ABS and non-ABS resource blocks. For example, a profile value of "0" may indicate no resource blocks should be allocated to ABS. A value of 8 may indicate that half of the resource blocks should be allocated to ABS resource blocks and half to non-ABS resource blocks. The profiles will also indicate which of the resource blocks are ABS and which are non-ABS. A value of "15" may indicate that all the resource blocks should be allocated to ABS resource blocks. The particular ABS/non-ABS profiles depend on the number of bits provided in the bit field and the needs of any particular implementation. For example, some embodiments may have 16 possible profiles but only use six. Thus, different values of the bit field 501 may represent the same profile or be undefined.

Based on the profiles provided, or the bitmap of FIG. 4, the metro access points 108$_1$ and 108$_2$ schedule their user equipment. The enhancements improve the spectrum efficiency, network performance, and ultimately enhance user experience. In the macro cell, the macro access point schedules UEs on non-protected subframes or in non-protected resource blocks during ABS. In the pico/metro cell range expansion (RE) area, shown in FIG. 1 as the cross hatched area 116$_1$ and 116$_2$, UEs 112$_3$ and 112$_4$ are scheduled on the protected subframes using the protected frequencies (resource blocks). In the pico/metro cell inner part, UEs 112$_2$ and 112$_5$ can be scheduled on any protected or non-protected subframe.

The option of protecting a variable amount of the bandwidth improves spectrum usage efficiency and end user experience. The option can be used regardless of the number of metro cells under the macro system. In the case with only a few metro cells in the macro cell coverage area, ABS can still be scheduled frequently to support low latency applications (e.g., voice over LTE) being utilized by UEs in the range expansion region of the metro cells while the amount of bandwidth allocated to ABS frequencies can be set to match HetNet needs.

Figure 6:
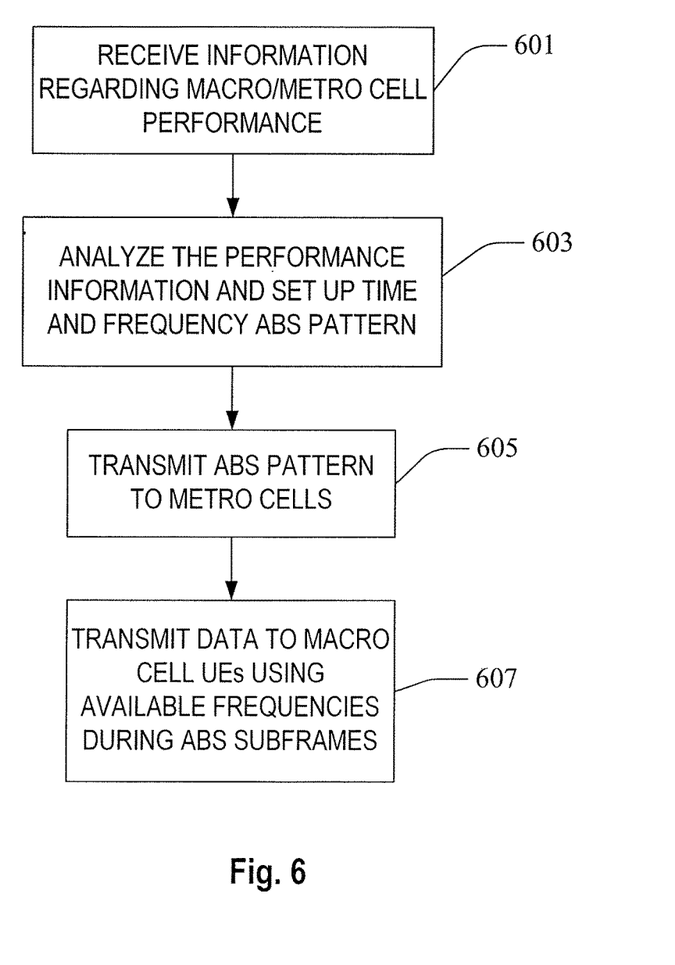
FIG. 6 illustrates an example method that schedules ABS in the time and frequency domain.

Referring to FIG. 6 the illustrated example schedules ABS with a frequency selective pattern. The ABS pattern can be for partial bandwidth or the whole bandwidth available in the downlink. The scheduler in 601 receives (or already has) information regarding macro/metro cell performance metrics and characteristics of the macro and metro cells. The scheduler performs data analytics in 603 based on such factors as number of metro cells, key performance indicators (for example, HetNet aggregated throughput, 5 percentile throughput, ABS utilization, voice latency, call failure rate), and based on the analysis, the scheduler selects an appropriate ABS pattern in the frequency domain (bandwidth allocation) and time domain (number and spacing of ABS subframes within a radio frame). For example, delay sensitive applications for UEs in the metro cell range expansion areas, may require relatively closely spaced ABS subframes but the number of frequency resources (resource blocks) allocated may be few if the number of metro cells is small. If current loading of the metro cells is light, inure frequency resources can be allocated to the macro cell and vice versa. If the call failure rate associated with the small cell is high, more resources can be allocated to address the high failure rate by, e.g., increasing the frequency band portion that is protected.

The enhancements of allocating almost blank subframes in both time and frequency improves the spectrum efficiency, and network performance, especially for latency sensitive applications such as Voice over LTE (VoLTE). The macro cell controller in 605, e.g., the eNodeB, exchanges the frequency selective ABS pattern with all the metro cells (under its coverage) over X2 via an enhanced Load Information message. The frequency selective pattern may be communicated using an ABS pattern information bitmap where the position in the bitmap represents a downlink subframe as shown in FIG. 2, and a bitmap string representing selective resource blocks as shown in FIG. 3. Thus, the metro cells know which subframe and which frequencies to schedule in the range expansion area. Rather than send the bitmap string representing all the resource blocks, the macro cell controller may send an ABS frequency pattern profile as shown in FIG. 4 for more efficient communications.

The use of frequency based ABS allocation can also be advantageously exploited by UE signal measurements to evaluate, e.g, or power, signal strength, and/or signal to noise ratios (SNR). By default, user equipment measures the whole spectrum for such measurements. In an embodiment the macro or metro cell controller, an eNodeB, overwrites the default configuration and specifically requests certain UEs to measure a particular portion of the bandwidth that is relevant to that specific UE. For example, the macro eNodeB has the macro cell edge UE only measure the partial BW in frequencies that are not protected by ABS, and small cell edge UEs, e.g., $112_3$ and $112_4$ can be controlled to only measure the partial BW allocated to ABS. That allows for measurements that are most relevant to the UEs.

In addition, use of a frequency selective ABS pattern facilitates the use of cell range expansion (CRE), which can be adjusted using bias settings for the UE. Specific CRE bias may be communicated to UE via the Qoffset parameter in System Information Block 4 (SIB4) for idle mode reselection so the UE can favor small cells. A similar offset is also available for connected mode handover parameters setting, which is sent to UE via a Radio Resource Control (RRC) Reconfiguration message. Range expansion bias expands the small cell range by adding the bias value to the measured received power for a UE in the small cell edge to ensure the UE continues to be served by the small cell rather than being handed over to the macro cell. Since the transmit power of the macro cell is larger, the received power from the macro cell measured by the UE, may be larger than the measured received power from the metro cell and a handover to the macro cell could occur absent the added bias. Maintaining the UE with the small cell can improve overall throughput and performance. Note, bias is not exchanged over X2 but is configured via the Operational Support System (OSS).

By using a more granular and flexible ABS pattern—frequency selective ABS, the macro cell can give up less frequency resources; while in the time domain, an aggressive ABS pattern can be used to ensure small cell edge UE performance for delay sensitive applications. Frequency selective ABS can also help macro cell UEs with delay sensitive applications. The macro cell can schedule UEs continuously and thus an LTE mechanism like Transmission Time Interval (TTI) bundling does not need to become limited by ABS. The frequency selective ABS improves the spectrum efficiency, network performance e.g. for VoLTE, and ultimately enhance user experience. Note that the concept of managing interference in both the time and frequency domain is not limited to an LTE based macro cell and metro cells but can be advantageously used in other technologies. For example, technologies such as Universal Mobile Telecommunications System (UMTS), Generation Partnership Project (3GPP) Long Term Evolution (LTE), Third Generation Partnership Project 2 (3GPP2) Ultra Mobile Broadband (UMB), High Speed Packet Access (HSPA), or IEEE 802.XX, and any other future radio technologies such as 5G, may advantageously exploit aspects of embodiments described herein.

Figure 7:
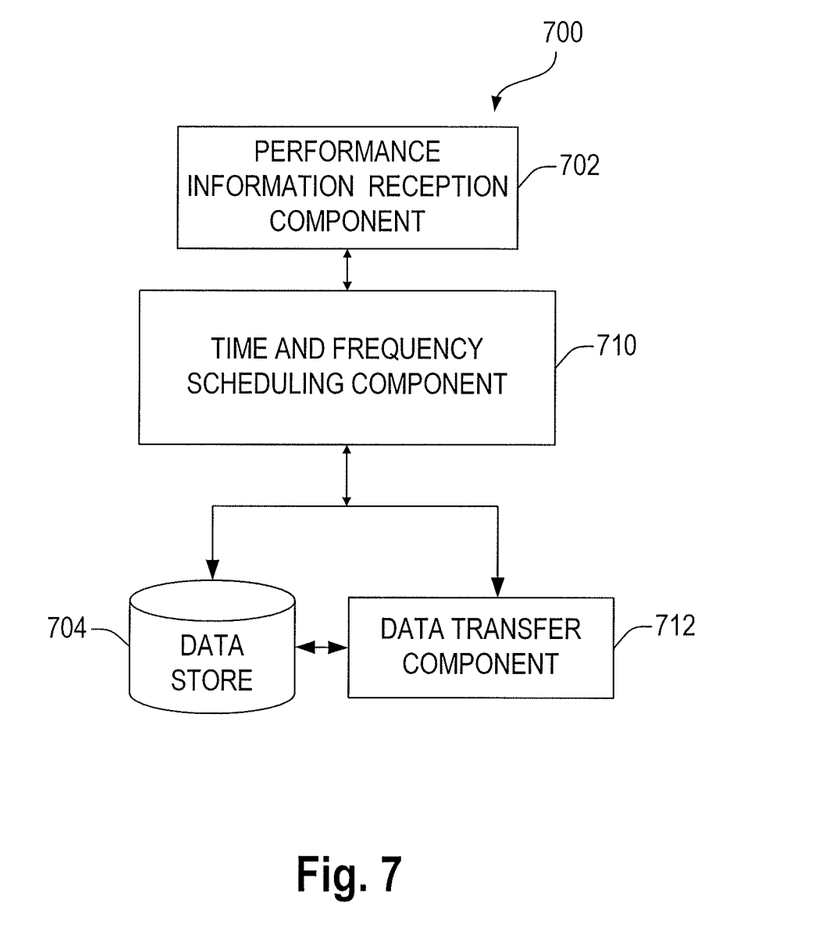
FIG. 7 illustrates an example block diagram of scheduler logic for scheduling almost blank subframes (ABS) in the time and frequency domain.

Referring to FIG. 7, illustrated is a block diagram of an ABS scheduling component 700 associated with a macro access point. The ABS scheduling component 700 includes a performance information reception component 702 that receives key performance indicators regarding metro and macro performance and other information such as macro and metro cell characteristics that may be relevant to determining the ABS frequency selective pattern. The ABS scheduling component includes an ABS time and frequency scheduling component 710 that determines the frequency allocation periodically, on-demand, in response to detecting an event (e.g., change in resource usage data), at a defined time, etc., and a data transfer component 712 that can provide the pattern bitmap to the neighbor access point(s), for example, via an X2 interface. As an example, the data transfer component 712 can transmit the pattern bitmap as part of (or appended to) a "load indication" message.

The ABS patterns can be configured dynamically by the network using self optimizing networks (SON) feature to optimize the frequency selective ABS pattern according to various criteria, such as, but not limited to, real-time source usage received from the neighbor access points, operator-defined policies received from a mobility network device, cell-edge users throughput, and/or load balancing, etc. As an example, the ABS time and frequency scheduling component 710 can initially schedule 30% of resource blocks as ABS resource blocks used during ABS subframes; however, if resource usage data or other key performance indicators received (e.g., periodically, on-demand, at a defined time, etc.) indicates that the metro cell utilizes only a portion of the allocated resources, then the ABS time and frequency scheduling component 710 can modify the ABS pattern bitmap to reduce the number of resource blocks allocated to ABS, e.g., to 25% of the resource blocks for an ABS subframe. Alternatively, the ABS time and frequency scheduling component 710 can increase the bandwidth allocated to ABS subframes by increasing the number of resource blocks allocated. Note that the time and frequency scheduling component 710 can also adjust the time domain to increase the number of ABS subframes even if the frequency allocated to each subframe is reduced to thereby help ensure that low latency applications in the metro cell edges are adequately served. The macro cell controller can utilize the pattern bitmap data determined by the ABS time and frequency scheduling component 710, respectively, to schedule and transmit data to its served UEs.

The performance data and any cell characteristics such as the number and power of metro cells, can be stored in data store 704 (and/or most any other internal or remote data store) such that the data can be analyzed by ABS time and frequency scheduling component 710 to improve HetNet performance and user satisfaction. It is noted that the data store 204 can include volatile memory(s) or nonvolatile memory(s), or can include both volatile and nonvolatile memory(s).

Although, the scheduling component 700 is shown to be part of the macro access point, note that any of the scheduling component 700, such as the performance information reception component 702, memory 704, and ABS time and frequency scheduling component 710, and the data transfer component 712 can reside (completely or partially) within any appropriate network device such as servers remote from the macro cell. Based on the frequency selective ABS pattern, the neighbor metro cells can transmit data packets to their cell-edge (or close to cell edge) UEs during the frequency selective ABS using the allocated bandwidth and serve their cell-center (or close to cell center) UEs in the rest of the subframes, such that the overall throughput of the UEs served by the neighbor metro cells is improved.

Figure 8:
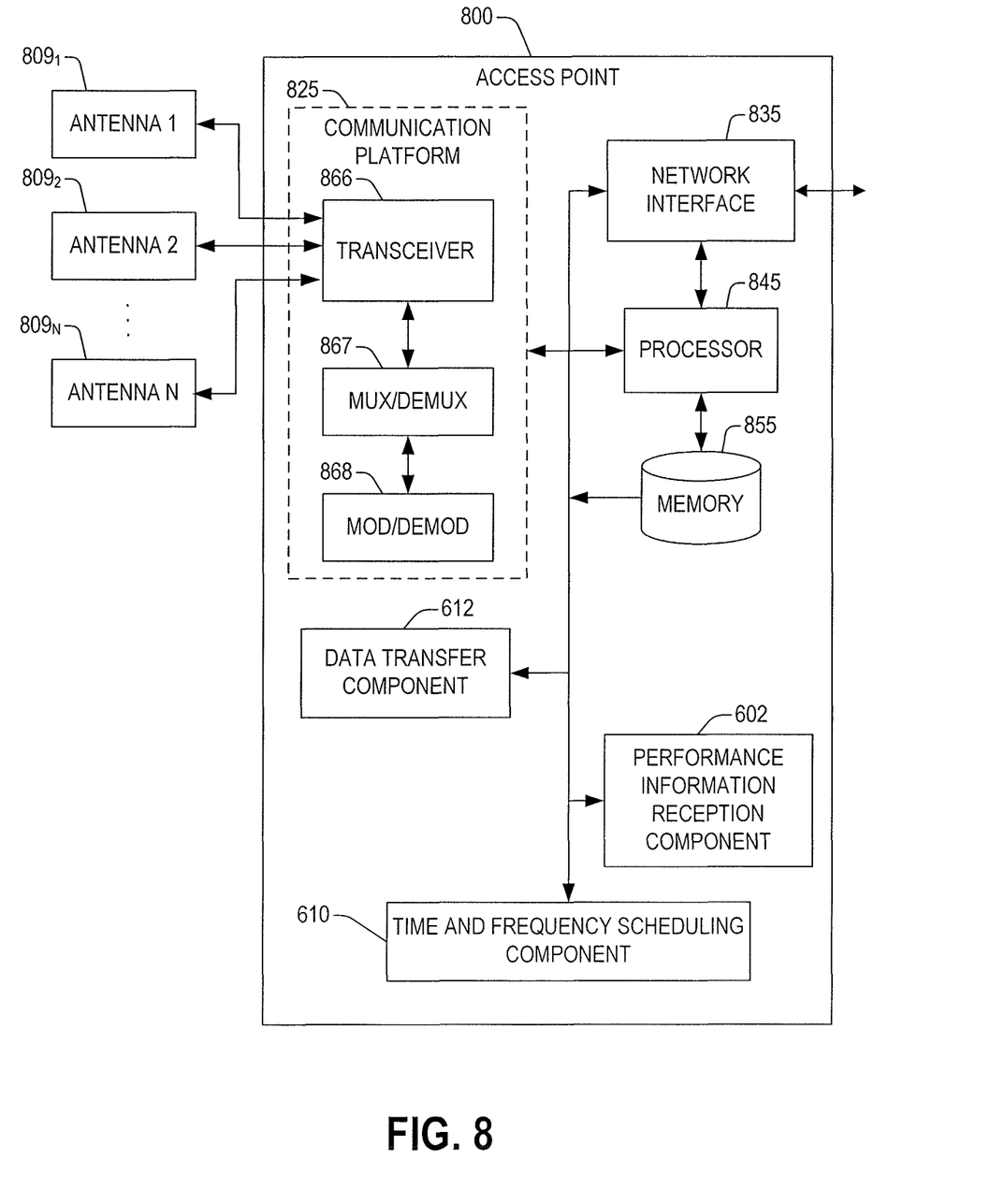
FIG. 8 illustrates a block diagram of an embodiment of macro control logic suitable to allocate frequency during scheduled ABS.

To provide further context for various aspects of the subject specification, FIG. 8 provides a high level block diagram of an example embodiment 800 of an access point that may be used to implement frequency selective ABS patterns. As an example, the macro access point 104 (and/or the metro access points $108_1$ and $108_2$) disclosed herein with respect to system 100 can each include at least a portion of the access point 800. In one aspect, the access point 800 can receive and transmit signal(s) (e.g., traffic and control signals) to and from UE, through a set of antennas $809_1$-$809_N$, for example, based on the frequency selective ABS pattern. Antennas $809_1$-$809_N$ form part of communication platform 825, which includes electronic components and associated circuitry for processing received signal(s) (data and control) and for processing signals (data and control) to be transmitted. Communication platform 825 can include a transmitter/receiver (e.g., a transceiver) 866 that can convert signal(s) from analog format to digital format upon reception, and from digital format to analog format for transmission, in addition, transceiver 866 can divide a single data stream into multiple, parallel data streams, or perform the reciprocal operation. Coupled to transceiver 866 is a multiplexer/demultiplexer 867 that facilitates manipulation of signals in the time and/or frequency domain. Multiplexer/demultiplexer 867 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, multiplexer/demultiplexer component 867 can scramble and spread information (e.g., codes) according to substantially any code known in the art A modulator/demodulator 868 is also a part of communication platform 825, and can modulate information according to multiple modulation techniques, such as frequency modulation, amplitude modulation (e.g., M-ary quadrature amplitude modulation (QAM), with M a positive integer), phase-shift keying (PSK), and the like.

Access point 800 also includes one or more processors 845 configured to confer functionality, at least partially, to substantially any electronic component in the access point 800, in accordance with aspects of the subject disclosure. In particular, processor 845 can facilitate implementing configuration instructions received through communication platform 825, which can include storing data in memory 855. In addition, processor 845 can facilitate processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 845 can manipulate antennas $809_1$-$809_N$ to facilitate beamforming or selective radiation pattern formation, which can benefit specific locations covered by the access point 802; and exploit substantially any other advantages associated with smart-antenna technology. Thus, the one or more processors 845 may include digital signal processing capability to effectuate necessary functions associated with reception and transmission of information via antennas $809_1$ to $809_N$.

Memory 855 can store data structures, code instructions, system or device information like device identification codes (e.g., International Mobile Station Equipment Identity (IMEI), Mobile Station International Subscriber Directory Number (MSISDN), serial number . . . ) and specify capabilities; code sequences for scrambling; spreading and pilot transmission, floor plan configuration, access point deployment and frequency plans; and so on. Moreover, memory 855 can store information related to ABS pattern generation in the time and frequency domain. In one example, data store 704 can be implemented in memory 855.

Processor 845 can be coupled to the memory 855 in order to store and retrieve information necessary to operate and/or confer functionality to communication platform 825, network interface 835 (e.g., that coupled the access point to core network devices such as but not limited to a network controller), and other operational components (e.g., multimode chipset(s), power supply sources . . . ; not shown) that support the access point 800. The access point 800 can further include a scheduling component 700 including the data reception component 702, the ABS time and frequency allocation component 710 and a data transfer component 712. One or more aspects of scheduling component 700 may be implemented in the one or more processors 845. In addition, it is to be noted that the various aspects disclosed in the subject specification can also be implemented through (i) program modules stored in a computer-readable storage medium or memory (e.g., memory 855) and executed by a processor (e.g., processor 845), or (ii) other combination(s) of hardware and software, or hardware and firmware.

In the subject specification, terms such as "data store," data a storage," "database," "cache," and substantially any other information storage component relevant to operation and functionality of a component, refer to any form of memory that can store information and be read by computers or processors. Memory may be volatile memory or nonvolatile memory, or both. Nonvolatile memory can include read only memory (ROM), programmable ROM (PROM), electrically programmable ROM (EPROM), electrically erasable ROM (EEPROM), or flash memory. In addition nonvolatile memory can include magnetic and optical memory. Volatile memory can include random access memory (RAM), available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Thus, aspects of frequency selective almost blank subframes have been described. The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. A method comprising:
scheduling in a heterogeneous network including a macro cell and at least one small cell within the macro cell, a first subframe pattern of a first radio frame in which a protected portion of a frequency band is allocated to one or more protected subframes of a radio frame for data transmission by a small cell access point and in which an unprotected portion of the frequency band is allocated to the one or more protected subframes of the radio frame for data transmission by a macro cell access point and both the protected portion of the frequency band and the unprotected portion of the frequency band are allocated to be used for data transmission by the macro cell access point during unprotected subframes;
wherein the scheduling includes,
allocating a first plurality of resource blocks to the one or more protected subframes, the first plurality of resource blocks being the protected portion of the frequency band; and
allocating a second plurality of resource blocks to the one more protected subframes, the second plurality of resource blocks being the unprotected portion of the frequency band;
adapting the scheduling of the one or more protected subframes in the frequency domain and the time domain to a second subframe pattern for transmission during a second radio frame subsequent to the first radio frame, the adapting responsive to resource usage, the resource usage including, at least in part, macro and metro cell performance metrics;
adapting the scheduling in the frequency domain by assigning a third plurality of resource blocks to the protected portion of the frequency band during protected subframes transmitted in the second radio frame and assigning a fourth plurality of resource blocks to the unprotected portion of the frequency band during the protected subframes transmitted in the second radio frame; and
adapting the scheduling in the time domain by changing a number of protected subframes within the second radio frame as compared to the first radio frame.

2. The method as recited in claim 1 further comprising the macro cell access point transmitting almost blank subframes in the protected portion of the frequency band during the one or more protected subframes.

3. The method as recited in claim 1, further comprising:
scheduling user equipment in the macro cell on the unprotected subframes;
scheduling user equipment in the small cell on any of the protected or unprotected subframes of the first radio frame; and
scheduling user equipment in a small cell range expansion area only on the protected subframes of the first radio frame using the protected portion of the frequency band.

4. The method as recited in claim 1, further comprising:
adapting allocation of the protected subframes and unprotected subframes according to one or more low latency service requirements of the at least one small cell such that a spacing of protected subframes within the radio frame decreases with an increase in the one or more low latency service requirements; and
wherein the one or more low latency service requirements include voice over long term evolution (VoLTE).

5. The method as recited in claim 1 further comprising first control logic associated with the macro cell causing information identifying the protected and unprotected portions of the frequency band to be supplied to the small cell access point using a plurality of bits, with each bit of the plurality of bits corresponding to a respective resource block, a first value for each of the bits identifying an associated resource block as a protected resource block and a second value for each of the bits identifying the associated resource block as an unprotected resource block.

6. The method as recited in claim 1 further comprising first control logic associated with the macro cell causing information to be supplied to the small cell access point identifying the protected and unprotected portions of the frequency band by identifying one of a plurality of profiles, each of the profiles associated with a predetermined allocation of resource blocks to the protected portion and the unprotected portion of the frequency band.

7. The method as recited in claim 1 further comprising control logic in the macro cell instructing user equipment in an edge of the macro cell to measure one or more parameters of received signals only for the unprotected portion of the frequency band.

8. The method as recited in claim 1 further comprising control logic in the small cell instructing user equipment in an edge of the small cell to measure one or more parameters of received signals only for the protected portion of the frequency band.

9. A heterogeneous network including a macro cell and a small cell, the heterogeneous network comprising:
control logic associated with the macro cell configured to dynamically schedule, responsive to first performance information, a subframe pattern in frequency and time in which a first portion of a frequency band is protected in one or more protected subframes of a first radio frame, the first portion being a first plurality of resource blocks, and a second portion of the frequency band is unprotected during the one or more protected subframes, the second portion being a second plurality of resource blocks, the second portion of the frequency band for transmission of data by a macro cell access point in the macro cell during the one or more protected subframes and the macro cell access point does not transmit data in the first portion of the frequency band during the one or more protected subframes,
wherein the control logic is responsive to second performance information of the macro cell and the small cell to adjust a number of protected subframes within a second radio frame from a first number of protected subframes in the first radio frame to a second number of protected subframes in the second radio frame and to adjust allocation of the first portion of the frequency band that is protected in protected subframes of the first radio frame to a third portion of the frequency band that is protected in protected subframes of the second radio frame, the third portion of the frequency band having a third plurality of resource blocks and to adjust allocation of the second portion of the frequency band that is unprotected in the protected subframes of the first radio frame to a fourth portion of the frequency band that is unprotected in the protected subframes of the second radio frame, the fourth portion of the frequency band having a fourth plurality of resource blocks; and at least one transmitter of the macro cell access point responsive to scheduling of the first radio frame by the control logic to transmit data in the second portion of the frequency band and not the first portion during the one or more protected subframes and to transmit data in the first portion and the second portion of the frequency band during unprotected subframes of the first radio frame and the at least one transmitter is responsive to scheduling by the control logic of the second radio frame to transmit data in the fourth portion of the frequency band and not the third portion of the frequency band during the protected subframes of the second radio frame and to transmit data in the third and fourth portions of the frequency band during the unprotected subframes of the second radio frame.

10. The heterogeneous network as recited in claim 9 wherein the at least one transmitter transmits almost blank subframes in the first portion of the frequency band during the protected subframes of the first radio frame and in the third portion of the frequency band during protected subframes of the second radio frame.

11. The heterogeneous network as recited in claim 9, wherein the control logic associated with the macro cell schedules user equipment served by the macro cell on the unprotected subframes of the first radio frame and in the second portion of the frequency band during the protected subframes.

12. The heterogeneous network as recited in claim 11, further comprising second control logic associated with the small cell, the second control logic configured to be responsive to information received from the control logic associated with the macro cell to schedule user equipment in a small cell range expansion area only in the first portion of the frequency band on the protected subframes of the first radio frame and to schedule user equipment in an inner part of the small cell on any of the protected or unprotected subframes of the first radio frame.

13. The heterogeneous network as recited in claim 11, wherein the control logic associated with the macro cell is responsive to adapt allocation of the protected and unprotected subframes of the first radio frame according to low latency service requirements of the small cell.

14. The heterogeneous network as recited in claim 9 further comprising the control logic associated with the macro cell configured to instruct user equipment in an edge of the macro cell to measure one or more parameters of received signals only for the second portion of the frequency band that is unprotected during the first radio frame.

15. The heterogeneous network as recited in claim 9 comprising control logic in the small cell configured to instruct user equipment in an edge of the small cell to measure one or more parameters of received signals only for the first portion of the frequency band that is protected during the first radio frame and only for the third portion of the frequency band that is protected during the second radio frame.

16. A heterogeneous network comprising:
a macro cell having a first coverage area and having a macro cell access point;
at least one small cell having a second coverage area that overlaps with a portion of the first coverage area and having a small cell access point;
first control logic associated with the macro cell includes a time and frequency scheduling component configured to schedule protected subframes of a first radio frame in time and frequency by scheduling a first number of subframes of the first radio frame to be the protected subframes and a second number of subframes of the first radio frame to be unprotected subframes and to schedule a first portion of a frequency band used during the protected subframes as a protected portion and a second portion of the frequency band used during the protected subframes as an unprotected portion, the first control logic being further configured to cause subframe pattern information regarding allocation of the first and second portions of the frequency band and which subframes of the first radio frame are protected subframes to be communicated to second control logic associated with the small cell;
the macro cell access point including at least one transmitter responsive to the scheduling to transmit data only over the unprotected portion during the protected subframes and to transmit data over the protected and unprotected portions during the unprotected subframes; and
at least one transmitter in the small cell to transmit data to user equipment in a range extension area of the small cell during the protected subframes using the protected portion of the frequency band;
wherein the time and frequency scheduling component allocates a first plurality of resource blocks to the protected portion of the frequency band in the protected subframes of the first radio frame;
wherein the time and frequency scheduling component allocates a second plurality of resource blocks to the unprotected portion of the frequency band in the protected subframes of the first radio frame;
wherein, responsive to performance information, the time and frequency scheduling component dynamically schedules a third number of subframes of a second radio frame to be protected subframes of the second radio frame and a fourth number of subframes of the second radio frame to be unprotected subframes of the second radio frame; and
wherein, responsive to the performance information, the time and frequency scheduling component dynamically allocates a third portion of the frequency band to a protected portion of the frequency band during the protected subframes of the second radio frame and allocates a fourth portion of the frequency band to an unprotected portion of the frequency band during the protected subframes of the second radio frame;
wherein the third portion of the frequency band is a third plurality of resource blocks and the fourth portion of the frequency band is a fourth plurality of resource blocks.

17. The heterogeneous network as recited in claim 16 wherein the time and frequency scheduling component is responsive to the performance information to increase a number of the protected subframes in the second radio frame from the first number of protected subframes in the first radio frame to the third number of protected subframes the second radio frame and to decrease the first plurality of resource blocks in the protected subframes of the first radio frame to the third plurality of resource blocks in the protected subframes of the second radio frame and to increase the fourth plurality of resource blocks in the protected subframes of the second radio frame from the second plurality of resource blocks in the protected subframes of the first radio frame.

18. The heterogenous network as recited in claim 16, wherein second control logic in the small cell instructs first user equipment in an edge of the small cell to measure one or more parameters of received signals only for the first portion of the frequency band during the protected subframes of the first and second radio frames; and
wherein the first control logic in the macro cell instructs second user equipment in an edge of the macro cell to measure one or more parameters of received signals only for the second portion of the frequency band during the protected subframes of the first radio frame and the fourth portion of the frequency band during the protected subframes of the second radio frame.

19. The heterogenous network as recited in claim 16, wherein the first control logic associated with the macro cell is configured to generate as the subframe pattern information a first bit field including plurality of bits identifying the protected and unprotected portions of the frequency band, with each bit of the plurality of bits corresponding to a respective resource block, a first value for each of the bits identifying an associated resource block as a protected resource block during the protected subframes and a second value for each of the bits identifying the associated resource block as an unprotected resource block during the protected subframes;
wherein the first control logic is configured to generate as part of the subframe pattern information a second bit field that specifies which of the subframes of the first radio frame are unprotected subframes and which are protected subframes; and
wherein the first control logic is configured to transmit the first and second bit fields to the small cell access point.

20. The heterogeneous network as recited in claim 9 wherein the control logic associated with the macro cell is configured to generate four bits of information identifying one of a plurality of profiles according to a value of the four bits, respective ones of the profiles associated with a predetermined allocation of respective resource blocks to the first portion and the second portion of the frequency band and the control logic is configured to cause a selected one of the plurality of profiles to be communicated to small cell control logic.

* * * * *